(12) United States Patent
Liu

(10) Patent No.: US 12,665,719 B2
(45) Date of Patent: Jun. 23, 2026

(54) INFORMATION TRANSMISSION METHOD AND APPARATUS, COMMUNICATION DEVICE AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 289 days.

(21) Appl. No.: 18/286,190

(22) PCT Filed: Apr. 8, 2021

(86) PCT No.: PCT/CN2021/086010
§ 371 (c)(1),
(2) Date: Oct. 9, 2023

(87) PCT Pub. No.: WO2022/213330
PCT Pub. Date: Oct. 13, 2022

(65) Prior Publication Data
US 2024/0187180 A1     Jun. 6, 2024

(51) Int. Cl.
| | |
|---|---|
| *H04W 4/00* | (2018.01) |
| *H04B 7/06* | (2006.01) |
| *H04L 5/00* | (2006.01) |
| *H04W 68/02* | (2009.01) |
| *H04W 72/0453* | (2023.01) |
| *H04W 72/232* | (2023.01) |
| *H04W 76/20* | (2018.01) |

(52) U.S. Cl.
CPC ......... *H04L 5/0051* (2013.01); *H04B 7/0626* (2013.01); *H04W 68/02* (2013.01); *H04W 72/0453* (2013.01); *H04W 72/232* (2023.01); *H04W 76/20* (2018.02)

(58) Field of Classification Search
None
See application file for complete search history.

(56) References Cited

U.S. PATENT DOCUMENTS

2020/0145981 A1     5/2020  Harada et al.
2022/0069959 A1*    3/2022  Zarifi ...................... H04L 5/001

FOREIGN PATENT DOCUMENTS

| CN | 108616345 A | 10/2018 |
|---|---|---|
| CN | 109391432 A | 2/2019 |
| CN | 113271552 A | 8/2021 |

OTHER PUBLICATIONS

Chinese Patent Application No. 202180001080.0, Office Action dated Sep. 11, 2023, 9 pages.

(Continued)

*Primary Examiner* — Zewdu A Beyen
(74) *Attorney, Agent, or Firm* — Cozen O'Connor

(57) ABSTRACT

An information transmission method performed by a base station includes sending configuration information associated with N reference signals. The configuration information is at least configured to indicate a first configuration parameter common to the N reference signals, and the reference signals are at least configured to be received by at least one of an idle user equipment (UE) or an inactive UE, in which N is a positive integer greater than or equal to 2, and the first configuration parameter is configured to transmit the N reference signals.

18 Claims, 4 Drawing Sheets

(56)          References Cited

OTHER PUBLICATIONS

Chinese Patent Application No. 202180001080.0, English translation of Office Action dated Sep. 11, 2023, 7 pages.
European Patent Application No. 21935560.9, Search and Opinion dated Jan. 30, 2024, 11 pages.
Samsung "Moderator summary for TRS/CSI-RS occasion(s) for idle/inactive UEs" #GPP TSG RAN WG1 #104e, R1-2101218, Jan.-Feb. 2021, 84 pages.
PCT/CN2021/086010, International Search Report dated Jan. 6, 2022, 3 pages.
NTT Docomo, Inc. "Discussion on NR RRM measurement based on CSI-RS for L3 mobility" 3GPP TSG RAN WG1 NR Ad-Hoc#2, R1-1711070, Jun. 2017, 7 pages.
Huawei et al. "CSI-RS configuration parameters for L3 mobility" 3GPP TSG RAN WG1 NR Ad Hoc Meeting, R1-1709920, Jun. 2017, 5 pages.
Huawei et al. "Measurement based on CSI-RS for L3 mobility" 3GPP TSG RAN WG1 Meeting #90, R1-1713729, Aug. 2017, 5 pages.
Chinese Patent Application No. 202180001080.0 Office Action dated Mar. 29, 2024, 7 pages.
Chinese Patent Application No. 202180001080.0 English translation of Office Action dated Mar. 29, 2024, 7 pages.

* cited by examiner

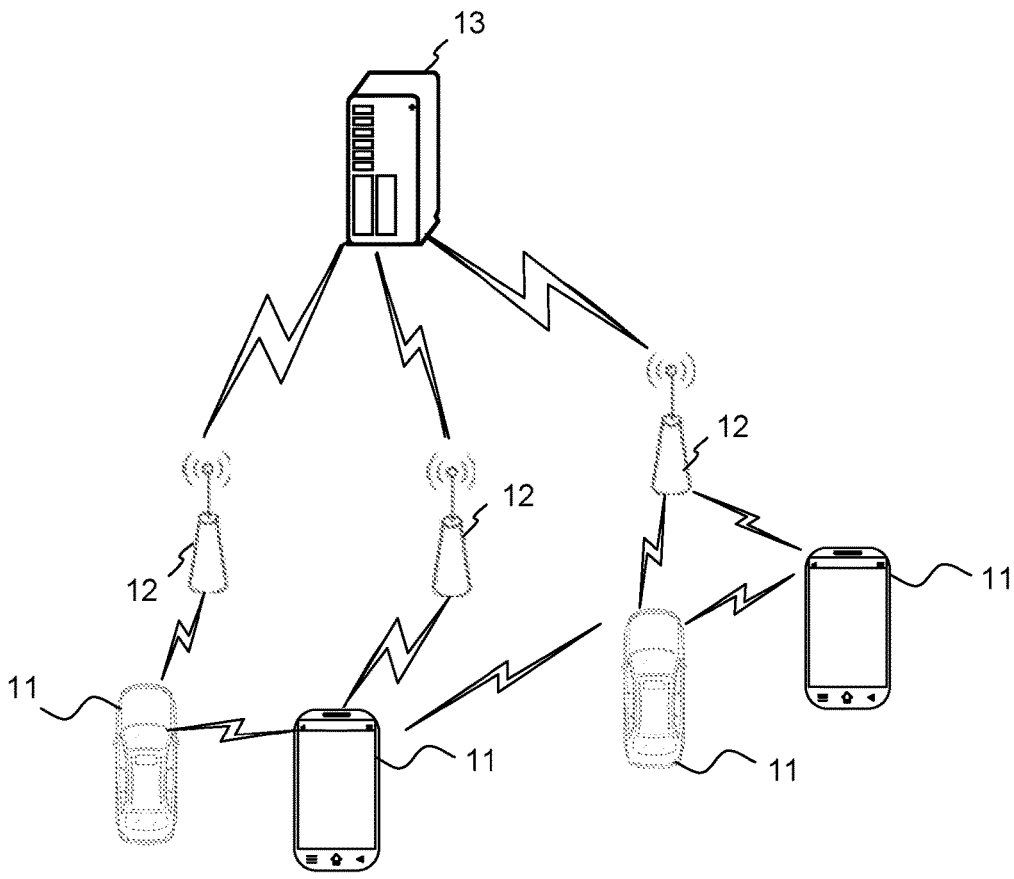

FIG. 1

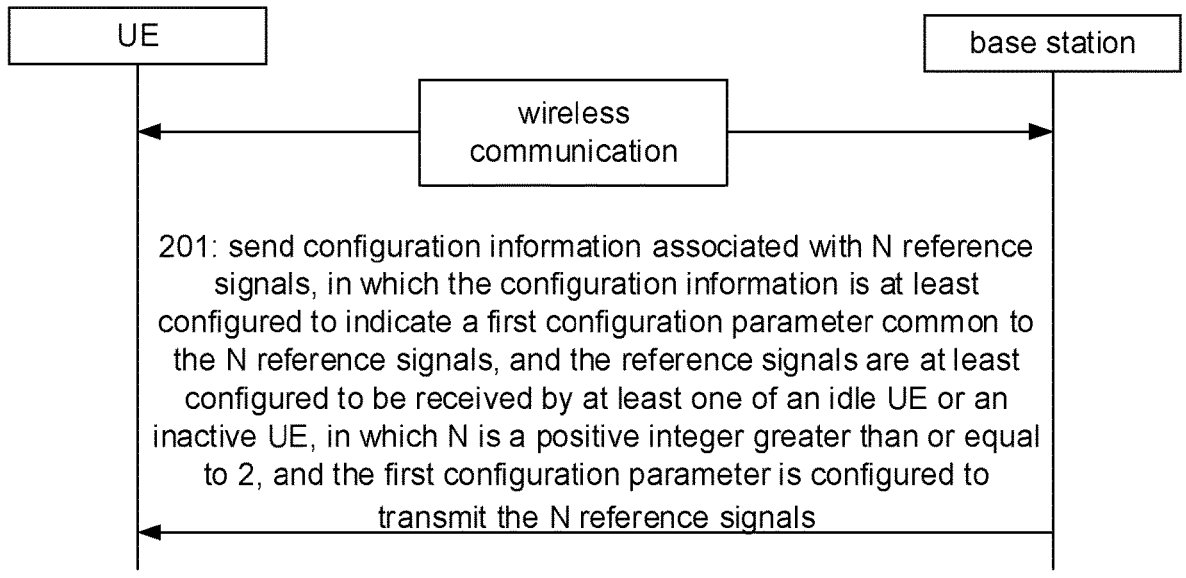

| UE | | base station |
| --- | --- | --- | wireless communication

201: send configuration information associated with N reference signals, in which the configuration information is at least configured to indicate a first configuration parameter common to the N reference signals, and the reference signals are at least configured to be received by at least one of an idle UE or an inactive UE, in which N is a positive integer greater than or equal to 2, and the first configuration parameter is configured to transmit the N reference signals

FIG. 2

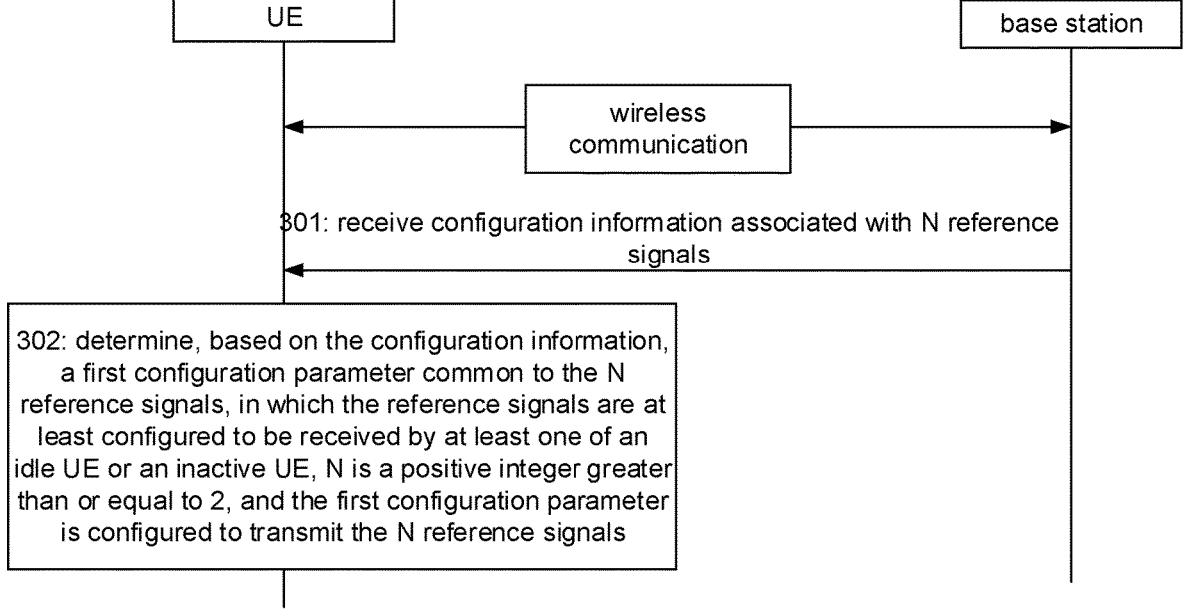

UE base station wireless communication

301: receive configuration information associated with N reference signals

302: determine, based on the configuration information, a first configuration parameter common to the N reference signals, in which the reference signals are at least configured to be received by at least one of an idle UE or an inactive UE, N is a positive integer greater than or equal to 2, and the first configuration parameter is configured to transmit the N reference signals

FIG. 3

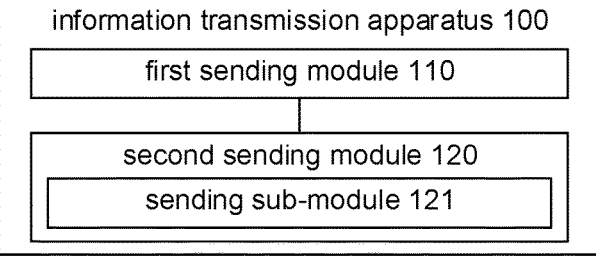

information transmission apparatus 100 first sending module 110 second sending module 120 sending sub-module 121

FIG. 4

INFORMATION TRANSMISSION METHOD AND APPARATUS, COMMUNICATION DEVICE AND STORAGE MEDIUM

CROSS-REFERENCE TO RELATED APPLICATION

This application is a national phase of International Application No. PCT/CN2021/086010, filed on Apr. 8, 2021, the content of which is hereby incorporated by reference in its entirety.

TECHNICAL FIELD

The disclosure relates to the field of wireless communication technology but is not limited to the field of wireless communication technology, in particular to an information transmission method, an information transmission apparatus, a communication device and a storage medium.

BACKGROUND

The 3rd Generation Partnership Project (3GPP) is a group of telecommunications standard development organization that cooperate to define wireless communication network capabilities. In the 3GPP standardization related to the power saving project of the Release 17 (R17), it was proposed that an idle User Equipment (UE) or an inactive UE can use at least one of an additional Tracking Reference Signal (TRS) or a Channel State Information Reference Signal (CSI-RS) to synchronize with a network in a time domain and a frequency domain.

SUMMARY

According to a first aspect, an information transmission method, performed by a base station, is provided. The method includes:

sending configuration information associated with N reference signals, in which the configuration information is at least configured to indicate a first configuration parameter common to the N reference signals, and the reference signals are at least configured to be received by at least one of an idle user equipment (UE) or an inactive UE, in which N is a positive integer greater than or equal to 2, and the first configuration parameter is configured to transmit the N reference signals.

According to a second aspect, an information transmission method, performed by a UE, is provided. The method includes:

receiving configuration information associated with N reference signals; and determining a first configuration parameter common to the N reference signals based on the configuration information, in which the reference signals are at least configured to be received by at least one of an idle UE or an inactive UE, N is a positive integer greater than or equal to 2, and the first configuration parameter is configured to transmit the N reference signals.

According to a third aspect, a communication device including a processor, a memory and an executable program stored on the memory and executable by the processor is provided. When the executable program is executed by the processor, the steps of the information transmission method according to the first aspect or the second aspect are performed.

BRIEF DESCRIPTION OF THE DRAWINGS

The accompanying drawings, which are incorporated in and constitute a part of this specification, illustrate embodiments consistent with the disclosure and, together with the description, serve to explain the principles of embodiments of the disclosure.

FIG. 1 is a schematic diagram illustrating a wireless communication system according to an example embodiment.

FIG. 2 is a flowchart illustrating an information transmission method according to an example embodiment.

FIG. 3 is a flowchart illustrating another information transmission method according to an example embodiment.

FIG. 4 is a block diagram illustrating an information transmission apparatus according to an example embodiment.

DETAILED DESCRIPTION

Figure 5:
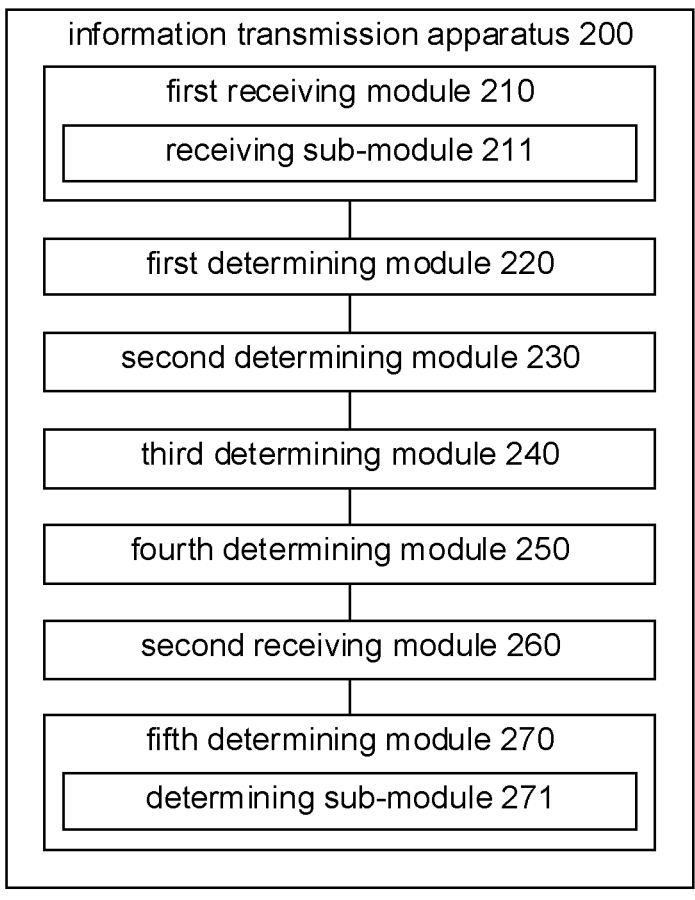
FIG. 5 is a block diagram illustrating another information transmission apparatus according to an example embodiment.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in embodiments of the disclosure are only for the purpose of describing specific embodiments, and are not intended to limit the disclosure. The singular forms of "a" and "the" used in embodiments of the disclosure and appended claims are also intended to include plural forms, unless the context clearly indicates other meanings. It is understandable that the term "and/or" as used herein refers to and includes any or all possible combinations of one or more associated listed items.

It is understandable that although the terms "first", "second", and "third" may be used in embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

FIG. 1 is a schematic diagram illustrating a wireless communication system according to an embodiment of the disclosure. As illustrated in FIG. 1, the wireless communication system is a communication system based on the cellular mobile communication technology. The wireless communication system may include: a plurality of terminals 11 and a plurality of base stations 12.

The terminal 11 may be a device that provides voice and/or data connectivity to a user. The terminal 11 may communicate with one or more core networks via a Radio Access Network (RAN). The terminal 11 may be an Internet of Things (IOT) terminal, such as a sensor device, a cell phone (or "cellular" phone), and a computer with the IoT terminal. For example, the terminal 11 may be a stationary, portable, pocket-sized, handheld, computer-built in, or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be an unmanned aerial vehicle device. Alternatively, the terminal 11 may be an in-vehicle device, for example, an Electronic Control Unit (ECU) having wireless communication function, or a wireless communication device externally connected to the ECU. Alternatively, the terminal 11 can also be a roadside device, for example, a street light, a signal light, or other roadside devices having the wireless communication function.

The base station 12 may be a network side device in the wireless communication system. The wireless communication system may be the 4th Generation (4G) mobile communication system, also known as a Long Term Evolution (LTE) system. Alternatively, the wireless communication system may also be a 5G system, also known as a New Radio (NR) system or a 5G NR system. Alternatively, the wireless communication system may be any next-generation system of the 5G system. The access network in the 5G system may be called a New Generation-RAN (NG-RAN) or a machine type communication (MTC) system.

The base station 12 can be an evolved base station (eNB) employed in the 4G system. Alternatively, the base station 12 may be a base station (gNB) with a centralized distributed architecture employed in the 5G system. When the base station 12 adopts a centralized distributed architecture, it usually includes a Central Unit (CU) and at least two Distributed Units (DUs). The CU is equipped with protocol stacks of a Packet Data Convergence Protocol (PDCP) layer, a Radio Link Control (RLC) layer, and a Media Access Control (MAC) layer. The DU is equipped with a protocol stack of a physical (PHY) layer, and the specific implementation of the base station 12 is not limited in the embodiments of this disclosure.

A wireless connection can be established between the base station 12 and the terminal 11 via a radio interface. In different implementations, the radio interface is a radio interface based on the 4G standard. Alternatively, the radio interface is a radio interface based on the 5G standard, for example, the radio interface is a NR. Alternatively, the radio interface may also be a radio interface based on a standard of the next generation of the 5G.

In some embodiments, an End to End (E2E) connection can also be established between the terminals 11, such as, Vehicle to Vehicle (V2V) communication, Vehicle to Infrastructure (V2I) communication, and Vehicle to Pedestrian (V2P) communication in Vehicle to Everything (V2X) communication scenario.

In some embodiments, the above wireless communication system may also include a network management device 13.

The plurality of base stations 12 are connected to the network management device 13 respectively. The network management device 13 may be a core network device in the wireless communication system, for example, a Mobility Management Entity (MME) in an Evolved Packet Core (EPC) network. Alternatively, the network management device may be other core network devices, such as a Serving Gate Way (SGW), a Public Data Network Gate Way (PGW), a Policy and Charging Rules Function (PCRF), or a Home Subscriber Server (HSS). The implementation form of the network management device 13 is not limited in the embodiments of the disclosure.

Execution objects involved in the embodiments of the disclosure include, but are not limited to, UEs, such as cell phone terminals that support cellular mobile communication, and base stations.

An application scenario of embodiments of the disclosure is that the base station may send multiple sets of Tracking Reference Signals (TRS) and/or Channel State Information Reference Signals (CSI-RS) to the UE for downlink synchronization. The base station needs to provide the UE with the configuration parameters of each set of TRSs and/or CSI-RSs, such as, time-frequency resource configuration parameters, Quasi Co-Location (QCL) configuration parameters and/or subcarrier spacing (SCS) configuration parameters, etc. configuring and sending a respective set of configuration parameters for each set of TRSs and/or CSI-RSs separately to the UE will increase the signaling load. Therefore, how to indicate the configuration parameters for multiple sets of TRSs and/or CSI-RSs to the UE without increasing too much signaling load is an urgent problem to be solved.

FIG. 2 is a flowchart illustrating an information transmission method according to an example embodiment. The information transmission method can be performed by a base station in a wireless communication. The method includes the following.

At block 201, configuration information associated with N reference signals is sent, in which the configuration information is at least configured to indicate a first configuration parameter common to the N reference signals, and the reference signals are at least configured to be received by at least one of an idle UE or an inactive UE, in which N is a positive integer greater than or equal to 2, and the first configuration parameter is configured to transmit the N reference signals.

Here, the UE may be a cellular phone terminal or the like that uses cellular mobile communication technology for wireless communication. The base station may be a communication device that provides an access network interface to the UE in the cellular mobile communication system. The idle UE may be a UE in an idle state and the inactive UE may be a UE in an inactive state.

The reference signal may be a signal used by the idle UE or the inactive UE for downlink synchronization.

In one embodiment, the reference signal includes: a Tracking Reference Signal (TRS) and/or a Channel State Information Reference Signal (CSI-RS).

Here, the TRS and/or CSI-RS may be shared by the idle UE and/or the inactive UE and/or a UE in the connected state. The idle UE, the inactive UE and/or the UE in the connected state may monitor the TRS and/or the CSI-RS at TRS and/or CSI-RS occasion(s).

For example, the idle UE and/or the inactive UE may perform the downlink synchronization based on the monitored TRS and/or CSI-RS.

In an embodiment, transmission resources corresponding to different reference signals are different.

Here, the transmission resources may include, but are not limited to: frequency domain resources, time domain resources and/or code domain resources.

The base station may send the reference signals through different transmission resources, and the UE receives the reference signals through different transmission resources.

Here, one configuration information can be associated with the N reference signals, in which N is greater than or equal to 2. Different reference signals can correspond to different transmission resources, such as different frequency domain resources and/or time domain resources.

The configuration information may indicate the first configuration parameter common to the N reference signals. That is, if the N reference signals correspond to the same first configuration parameter, then the first configuration parameter can be indicated by the configuration information.

The first configuration parameter is configured to transmit the N reference signals. The first configuration parameter may include, but is not limited to, one or more types of physical layer configuration parameters, such as time domain resource configuration parameter, frequency domain resource configuration parameter, period, density, power offset, and scrambling identifier (ID). The shared physical layer configuration parameter is used and thus there is no need to configure respective physical layer configuration parameter for each reference signal separately, functioning as the multiplexing of the physical layer configuration parameter.

The UE may determine, based on the configuration information, the first configuration parameter common to the N reference signals. There is no need to determine the respective first configuration parameter for each reference signal one by one.

In one embodiment, the first configuration parameter may include: a time-frequency resource configuration parameter, a Quasi Co-Location (QCL) configuration parameter, a bandwidth part (BWP) ID and/or a subcarrier spacing (SCS) configuration parameter.

The time-frequency resource configuration parameter is configured to indicate a time domain resource and/or a frequency domain resource for the reference signals.

The BWP ID is configured to indicate a BWP associated with a bandwidth for the reference signals.

The QCL configuration parameter may include: qcl-Info-PeriodicCSI-RS. The QCL configuration parameter is configured to configure a Synchronization Signal Block (SSB) in a QCL relation relative to the reference signals, and a QCL type.

The SCS configuration parameter may be configured to configure a SCS used by the idle UE and/or the inactive UE for monitoring and/or parsing the TRS and/or CSI-RS at the TRS and/or CSI-RS monitoring occasion(s). The SCS configuration parameter may include 15 KHz, 30 KHz, 60 KHz, 120 KHz and/or 240 KHz, and may be configured to indicate that the reference signals use the same SCS as the SSB.

In an embodiment, sending the configuration information associated with the N reference signals includes: sending system information carrying the configuration information.

Here, the configuration information may be carried in the system information, such as a System Information Block (SIB), and the system information carrying the configuration information is broadcasted to the UE. The UE may determine, based on the configuration information carried in the broadcasted system information, the first configuration parameter common to the N reference signals.

In this way, the first configuration parameter common to the N reference signals is indicated by the configuration information, and thus there is no need to configure respective first configuration parameter separately for each reference signal. On the one hand, the base station can reduce the signaling load required by sending the configuration parameters, and can optimize and multiplex as many physical layer configuration parameters as possible. On the other hand, the UE no longer needs to determine the respective first configuration parameter one by one for each reference signal, and can determine a single first configuration parameter for all reference signals at one time, which improves the efficiency of determining the configuration parameter.

In one embodiment, the configuration information is configured to indicate second configuration parameters respectively associated with the N reference signals, in which the first configuration parameter is different from the second configuration parameter, and the second configuration parameter is configured to transmit an associated reference signal.

Here, the second configuration parameter may include, but is not limited to, one or more types of physical layer configuration parameters. The second configuration parameter may be a type of configuration parameter that the configuration parameters of the reference signals may not be the same. For example, the second configuration parameter may be a type of physical layer configuration parameter that the physical layer configuration parameters of the reference signals may not be the same. The configuration information may indicate each second configuration parameter of each reference signal.

The second configuration parameters is different from the first configuration parameter and can be combined with the first configuration parameter, for transmitting the reference signals. The second configuration parameter includes, but is not limited to, one or more types of physical layer configuration parameters. The second configuration parameter includes, but is not limited to, a time-frequency resource configuration parameter, a QCL configuration parameter, a BWP ID and/or a SCS configuration parameter. The first configuration parameter and the second configuration parameter can be combined to form a complete configuration parameter of a corresponding reference signal, for transmitting the corresponding reference signal.

In this way, the configuration information of the reference signals is fully indicated through the first configuration parameter common to the reference signals and the second configuration parameters of the reference signals. Since there is no need to indicate first configuration parameters for the reference signals one by one, the base station can reduce the signaling load required by sending the configuration parameters, and can optimize and multiplex as many physical layer parameters as possible. The UE no longer needs to determine the first configuration parameters one by one for the reference signals, but the UE can determine a single first configuration parameter for all the reference signals at one time, which improves the efficiency of determining the configuration parameter.

In one embodiment, in response to the reference signal including a TRS and a CSI-RS, the second configuration parameter at least includes: a frequency domain resource configuration parameter and a time domain resource configuration parameter.

If the reference signal includes: a TRS and a CSI-RS, two separate sets of second configuration parameters need to be configured. The second configuration parameter may include: the time domain resource parameter and the frequency domain resource parameter. The QCL configuration parameter, the BWP ID and/or the SCS configuration parameter can be multiplexed. That is, the QCL configuration parameter, the BWP ID and/or the SCS configuration parameter in the first configuration parameters are multiplexed as those of the second configuration parameters. As illustrated in Table 1, the configuration information may indicate only one set of multiplexed first configuration parameter, including the QCL configuration parameter, the BWP ID and/or the SCS configuration parameter.

TABLE 1

| first configuration parameter | description |
| --- | --- |
| bwp-Id | BWP ID, which can be multiplexed for multiple reference signals |
| resourceType {periodic} | resource type: periodic |
| qcl-InfoPeriodicCSI-RS | this information element (IE) can be multiplexed for the reference signals to obtain the QCL relative to the SSB |
| subcarrierSpacing | one SCS can be multiplexed for reference signals |

In one embodiment, the configuration information is configured to indicate:

a third configuration parameter of a first reference signal in the N reference signals; and a shift value between a third configuration parameter of a second reference signal in the N reference signals and the third configuration parameter of the first reference signal, in which the first reference signal is different from the second reference signal, the first configuration parameter is different from the third configuration parameter, and the third configuration parameter is configured to transmit the reference signal associated with the third configuration parameter.

The third configuration parameter may include, but is not limited to, one or more types of physical layer configuration parameters. The third configuration parameter may be a type of configuration parameter that the configuration parameters of the reference signals may not be the same. For example, the third configuration parameter may be a type of physical layer configuration parameter that the physical layer configuration parameters of the reference signals may not be the same. The third configuration parameter includes, but is not limited to: a time frequency resource configuration parameter, a QCL configuration parameter, a BWP ID and/or a SCS configuration parameter. The third configuration parameter may be different from the first configuration parameter and can be combined with the first configuration parameter for transmitting the reference signal. The first configuration parameter and the third configuration parameter may be combined to form a complete configuration parameter for a corresponding reference signal for transmitting the corresponding reference signal. The first configuration parameter, the second configuration parameter and the third configuration parameter may be combined to form a complete configuration parameter for a corresponding reference signal for transmitting the corresponding reference signal.

For the type of physical layer configuration parameter that the physical layer configuration parameters of the reference signals may not be the same, the configuration information may be indicated by listing the second configuration parameters. The configuration information may also indicate the third configuration parameter of the first reference signal and the shift value between the third configuration parameter of the second reference signal that is different from the first reference signal and the third configuration parameter of the first reference signal.

For example, if the first reference signal and the second reference signal correspond to the same frequency domain configuration parameter but different time domain configuration parameters, the configuration information may indicate the frequency domain configuration parameter and the time domain configuration parameter of the first reference signal, and the shift value between the time domain configuration parameter of the second reference signal and the time domain configuration parameter of the first reference signal. In this example, the frequency domain configuration parameter is the above-mentioned "first configuration parameter", which is indicated only once by the configuration information; and the time domain configuration parameter is the "third configuration parameter". Upon receiving the configuration information, the UE may determine the frequency domain configuration parameter for the first reference signal and the second reference signal, and the time domain configuration parameter of the first reference signal, and the UE may determine the time domain configuration parameter of the second reference signal based on the shift value.

The configuration information may indicate all of the first configuration parameter, the second configuration parameters and/or the third configuration parameter.

In this way, third configuration parameters of other reference signals can be determined based on the third configuration parameter of a reference signal and shift values corresponding to other reference signals. Therefore, the number of configuration parameters indicated by the configuration information can be reduced and the signaling load can be reduced.

In one embodiment, in response to the reference signal including at least two TRSs, the first configuration parameter at least includes a frequency domain resource configuration parameter, and the third configuration parameter at least includes a time domain resource configuration parameter.

For example, if the first TRS and the second TRS correspond to the same frequency domain configuration parameter but different time domain configuration parameters, the frequency domain configuration parameter of the first TRS is the above-mentioned "first configuration parameter", and the time domain configuration parameter of the first TRS is the above-mentioned "third configuration parameter". The configuration information can indicate the shift value between the time domain configuration parameter of the second TRS and the time domain configuration parameter of the first TRS.

The UE determines the time domain configuration parameter for the second TRS based on the time domain configuration parameter of the first TRS and the shift value.

In this way, the time domain configuration parameter of the second TRS can be determined based on the time domain configuration parameter of the first TRS.

In an embodiment, the method further includes:

sending an available status indicator, in which the available status indicator is configured to indicate whether to send each reference signal on a corresponding transmission resource, indicated by the configured information, corresponding to each reference signal.

The available status indicator is configured to indicate that the base station sends each reference signal via a corresponding transmission resource corresponding to each reference signal.

When the base station configures at least one of the TRS or CSI-RS to be used by at least one of the idle UE or the inactive UE, the base station needs to indicate whether to send the TRS and/or CSI-RS on the transmission resource corresponding to the TRS and/or CSI-RS. i.e., indicating whether the TRS and/or CSI-RS is available. In this way, the case where the base station configures the transmission resource for the TRS and/or CSI-RS, but the base station does not send the TRS and/or CSI-RS can be reduced. Further, the case where the UE still performs TRS and/or CSI-RS detection even if the base station does not send the TRS and/or CSI-RS can be reduced. Therefore, the UE power can be saved.

The available status indicator can indicate whether each reference signal is available.

In one embodiment, the available status indicator is configured to indicate, using a bitmap, whether to send each reference signal on a corresponding transmission resource, indicated by the configuration information, corresponding to each reference signal.

For example, one bit in the bitmap can be used to indicate whether to send a corresponding reference signal. For example, the value "0" can be used to indicate to not send the corresponding reference signal, and the value "1" can be used to indicate to send the corresponding reference signal. Or, the value "1" can be used to indicate to not send the corresponding reference signal, and the value "2" can be used to indicate to send the corresponding reference signal.

In one embodiment, the available status indicator is configured to whether to send each reference signal on a corresponding beam for transmitting each reference signal indicated by the configuration information.

The available status indicator can indicate whether to send the reference signals on one or more beams.

For example, the available status indicator can be sent on one beam, and in this case, the available status indicator may indicate whether to send the reference signals on the beam.

The available status indicator can be sent on multiple beams, and in this case, the available status indicator may indicate whether to send the reference signals on the multiple beams.

In one embodiment, sending the available status indicator includes:

sending paging downlink control information (DCI) carrying the available status indicator.

The base station can carry the available status indicator in the paging DCI.

The paging DCI is configured to schedule a paging message. The UE can determine, based on the paging DCI, whether to wake up to receive the paging message. The UE needs to perform the synchronization when the UE wakes up. By indicating whether to wake up and whether the reference signal is available through a single signaling, the amount of information carried by the signaling is increased, and the signaling load generated by indicating the above through two separated signaling is reduced.

FIG. 3 is a flowchart illustrating an information transmission method according to an example embodiment. The information transmission method can be performed by a base station in a wireless communication. The method includes the following.

At block 301, configuration information associated with N reference signals is received.

At block 302, a first configuration parameter common to the N reference signals is determined based on the configuration information, in which the reference signals are at least configured to be received by at least one of an idle UE or an inactive UE, N is a positive integer greater than or equal to 2, and the first configuration parameter is configured to transmit the N reference signals.

Here, the UE may be a cellular phone terminal or the like that uses cellular mobile communication technology for wireless communication. The base station may be a communication device that provides an access network interface to the UE in the cellular mobile communication system. The idle UE may be a UE in an idle state and the inactive UE may be a UE in an inactive state.

The reference signal may be a signal used by the idle UE or the inactive UE for downlink synchronization.

In one embodiment, the reference signal includes: a TRS and/or a CSI-RS.

Here, the TRS and/or CSI-RS may be shared by the idle UE and/or the inactive UE and/or the UE in the connected state. The idle UE, the inactive UE and/or the UE in the connected state may monitor the TRS and/or the CSI-RS at TRS and/or CSI-RS occasion(s).

For example, the idle UE and/or the inactive UE may perform the downlink synchronization based on the monitored TRS and/or CSI-RS.

In one embodiment, transmission resources corresponding to different reference signals are different.

Here, the transmission resources may include, but are not limited to: frequency domain resources, time domain resources and/or code domain resources.

The base station may send the reference signals through different transmission resources, and the UE receives the reference signals through different transmission resources.

Here, one configuration information can be associated with the N reference signals, N being greater than or equal to 2. Different reference signal can corresponding to different transmission resources, such as different frequency domain resources and/or time domain resources.

The configuration information may indicate the common first configuration parameter of the N reference signals. That is, if the N reference signals correspond to the same first configuration parameter, the first configuration parameter can be indicated by the configuration information.

The first configuration parameter is configured to transmit the N reference signals. The first configuration parameter may include, but is not limited to, one or more types of physical layer configuration parameters, such as time domain resource configuration parameter, frequency domain resource configuration parameter, period, density, power offset, and scrambling ID. The shared physical layer configuration parameter is used and thus there is no need to configure respective physical layer configuration parameter separately for each reference signal, functioning as the multiplexing of the physical layer configuration parameter.

The UE may determine, based on the configuration information, the first configuration parameter common to the N reference signals. There is no need to determine the respective first configuration parameter for each reference signal one by one.

In one embodiment, the first configuration parameter may include: a time-frequency resource configuration parameter, a QCL configuration parameter, a BWP ID and/or a SCS configuration parameter.

The time frequency resource configuration parameter is configured to indicate a time domain resource and/or a frequency domain resource for the reference signals.

The BWP ID is configured to indicate a BWP associated with a bandwidth for the reference signals.

The QCL configuration parameter may include: qcl-Info-PeriodicCSI-RS.

The QCL configuration parameter is configured to configure a SSB in a QCL relation relative to the reference signals, and a QCL type.

The SCS configuration parameter may be configured to configure a SCS used by the idle UE and/or the inactive UE for monitoring and/or parsing the TRS and/or CSI-RS at the TRS and/or CSI-RS monitoring occasion(s). The SCS configuration parameter may include 15 KHz, 30 KHz, 60 KHz, 120 KHz and/or 240 KHz, and may be used to indicate that the reference signals use the same SCS as the SSB.

In an embodiment, sending the configuration information associated with the N reference signals includes sending system information carrying the configuration information.

Here, the configuration information may be carried in the system information, such as a SIB, and the system information carrying the configuration information is broadcasted to the UE. The UE may determine, based on the configuration information carried in the broadcasted system information, the first configuration parameter common to the N reference signals.

In this way, the first configuration parameter common to the N reference signals is indicated by the configuration information, and there is no need to configure respective first configuration parameter separately for each reference signal. On the one hand, the base station can reduce the signaling load required by sending the configuration parameters, and can optimize and multiplex as many physical layer configuration parameters as possible. On the other hand, the UE no longer needs to determine the respective first configuration parameter one by one for each reference signal, and can determine a single first configuration parameter for all reference signals at one time, which improves the efficiency of determining the configuration parameter.

In one embodiment, the method further includes: determining, based on the configuration information, second configuration parameters respectively associated with the N reference signals, in which the first configuration parameter is different from the second configuration parameter, and the second configuration parameter is configured to transmit an associated reference signal.

Here, the second configuration parameter may include, but is not limited to, one or more types of physical layer configuration parameters. The second configuration parameter may be a type of configuration parameter that configuration parameters of the reference signals may not be the same. For example, the second configuration parameter may be a type of physical layer configuration parameter that the physical layer configuration parameters of the reference signals may not be the same. The configuration information may indicate each second configuration parameter of each reference signal.

The second configuration parameters are different from the first configuration parameter and can be combined with the first configuration parameter, for transmitting the reference signals. The second configuration parameter includes, but is not limited to, one or more types of physical layer configuration parameters. The second configuration parameter includes, but is not limited to, a time-frequency resource configuration parameter, a QCL configuration parameter, a BWP ID and/or a SCS configuration parameter. The first configuration parameter and the second configuration parameter can be combined to form a complete configuration parameter of a corresponding reference signal for transmitting the corresponding reference signal.

In this way, the configuration information of the reference signals is fully indicated through the first configuration parameter common to the reference signals and the second configuration parameters of the reference signals. Since there is no need to indicate first configuration parameters for the reference signals one by one, the base station can reduce the signaling load required by sending the configuration parameters, and can optimize and multiplex as many physical layer parameters as possible. The UE no longer needs to determine the first configuration parameters one by one for the reference signals, but the UE can determines a single first configuration parameter for all the reference signals at one time, which improves the efficiency of determining the configuration parameter.

In one embodiment, in response to the reference signal including: a TRS and a CSI-RS, the second configuration parameter at least includes: a frequency domain resource configuration parameter and a time domain resource configuration parameter.

If the reference signal includes: a TRS and a CSI-RS, two separate sets of second configuration parameters need to be configured. The second configuration parameter may include: the time domain resource parameter and the frequency domain resource parameter. The QCL configuration parameter, the BWP ID and/or the SCS configuration parameter can be multiplexed. That is, the QCL configuration parameter, the BWP ID and/or the SCS configuration parameter in the first configuration parameters are multiplexed as those of the second configuration parameters. As illustrated in Table 1, the configuration information may indicate only one set of reused first configuration parameters, including the configuration parameters, such as the QCL configuration parameter, the BWP ID and/or the SCS configuration parameter.

In one embodiment, the method further includes:

determining, based on the configuration information, a third configuration parameter of a first reference signal in the N reference signals, and determining a shift value between a third configuration parameter of a second reference signal in the N reference signals and the third configuration parameter of the first reference signal; and determining, based on the third configuration parameter of the first reference signal and the shift value, the third configuration parameter of the second reference signal, in which the first configuration parameter is different from the third configuration parameter, and the third configuration parameter is configured to transmit the reference signal associated with the third configuration parameter.

The third configuration parameter may include, but is not limited to, one or more types of physical layer configuration parameters. The third configuration parameter may be a type of configuration parameter that the configuration parameters of the reference signals may not be the same. For example, the third configuration parameter may be a type of physical layer configuration parameter that the physical layer configuration parameters of the reference signals may not be the same. The third configuration parameter includes, but is not limited to: a time frequency resource configuration parameter, a QCL configuration parameter, a BWP ID and/or a SCS configuration parameter. The third configuration parameter may be different from the first configuration parameter and can be combined with the first configuration parameter for transmitting the reference signal. The first configuration parameter and the third configuration parameter may be combined to form a complete configuration parameter for a corresponding reference signal for transmitting the corresponding reference signal. The first configuration parameter, the second configuration parameter and the third configuration parameter may be combined to form a complete configuration parameter for a corresponding reference signal for transmitting the corresponding reference signal.

For the type of physical layer configuration parameter that the physical layer configuration parameters of the reference signals may not be the same, the configuration information may be indicated by listing the second configuration parameters. The configuration information may also indicate the third configuration parameter of the first reference signal and the shift value between the third configuration parameter of the second reference signal that is different from the first reference signal and the third configuration parameter of the first reference signal.

For example, if the first reference signal and the second reference signal correspond to the same frequency domain configuration parameter but different time domain configuration parameters, the configuration information may indicate the frequency domain configuration parameter and the time domain configuration parameter of the first reference signal, and the shift value between the time domain configuration parameter of the second reference signal and the time domain configuration parameter of the first reference signal. The frequency domain configuration parameter is the above-mentioned "first configuration parameter", which is indicated only once by the configuration information, and the time domain configuration parameter is the above-mentioned "third configuration parameter". Upon receiving the configuration information, the UE may determine the frequency domain configuration parameter for the first reference signal and the second reference signal, and the time domain configuration parameter of the first reference signal, and the UE may determine the time domain configuration parameter of the second reference signal according to the shift value.

The configuration information may indicate all of the first configuration parameter, the second configuration parameters and/or the third configuration parameter.

In this way, third configuration parameters of other reference signals can be determined based on the third configuration parameter of a reference signal and shift values corresponding to other reference signals. Therefore, the number of configuration parameters indicated by the configuration information can be reduced and the signaling load can be reduced.

In one embodiment, in response to the reference signal including: at least two TRSs, the first configuration parameter at least includes a frequency domain resource configuration parameter, and the third configuration parameter at least includes a time domain resource configuration parameter.

For example, if the first TRS and the second TRS correspond to the same frequency domain configuration parameter but different time domain configuration parameters, the frequency domain configuration parameter of the first TRS is the above-mentioned "first configuration parameter", and the time domain configuration parameter of the first TRS is the above-mentioned "third configuration parameter". The configuration information can indicate the shift value between the time domain configuration parameter of the second TRS and the time domain configuration parameter of the first TRS.

The UE determines the time domain configuration parameter of the second TRS based on the time domain configuration parameter of the first TRS and the shift value.

In this way, the time domain configuration parameter of the second TRS can be determined based on the time domain configuration parameter of the first TRS.

In an embodiment, the method further includes:
receiving an available status indicator; and
determining, based on the available status indicator, whether to send each reference signal on a corresponding transmission resource, indicated by the configuration information, corresponding to each reference signal.

The available status indicator is configured to instruct the base station to send each reference signal via a corresponding transmission resource corresponding to each reference signal.

When the base station configures the TRS and/or CSI-RS to be used by the idle UE and/or the inactive UE, the base station needs to specify whether to send the TRS and/or CSI-RS on the transmission resource corresponding to the TRS and/or CSI-RS. i.e., indicating whether the TRS and/or CSI-RS is available. In this way, the case where the base station configures the transmission resource for the TRS and/or CSI-RS, but the base station does not send the TRS and/or CSI-RS can be reduced. Therefore, the case where the UE still performs TRS and/or CSI-RS detection even if the base station does not send the TRS and/or CSI-RS can be reduced. Therefore, the UE power can be saved.

The available status indicator can indicate whether each reference signal is available.

In one embodiment, the available status indicator is configured to indicate, using a bitmap, whether to send each reference signal on a corresponding transmission resource, indicated by the configuration information, corresponding to each reference signal indicated by the configuration information, using a bitmap.

For example, one bit in the bitmap can be used to indicate whether to send a corresponding reference signal. For example, the value "0" can be used to indicate to not send the corresponding reference signal, and the value "1" can be used to indicate to send the corresponding reference signal. Or, the value "1" can be used to indicate to not send the corresponding reference signal, and the value "2" can be used to indicate to send the corresponding reference signal.

In one embodiment, determining, based on the available status indicator, whether to send each reference signal on the corresponding transmission resource, indicated by the configuration information, corresponding to each reference signal includes:
determining, based on the available status indicator, whether to send each reference signal on a corresponding beam for transmitting each reference signal indicated by the configuration information.

The available status indicator can indicate whether to send the reference signals on one or more beams.

For example, the available status indicator can be sent on one beam, and in this case, the available status indicator may indicate whether to send the reference signals on the beam.

The available status indicator can be sent on multiple beams, and in this case, the available status indicator may indicate whether to send the reference signals on the multiple beams.

In one embodiment, receiving the available status indicator includes:
receiving paging DCI carrying the available status indicator.

The base station can carry the available status indicator in the paging DCI.

The paging DCI is configured to transmit a paging message. The UE can determine, based on the paging DCI, whether to wake up to receive the paging message. The UE needs to perform the synchronization when the UE wakes up. By indicating whether to wake up and whether the reference signal is available through a single signaling, the amount of information carried by the signaling is increased, and the signaling load generated by indicating the above through two separated signaling is reduced.

A specific example will be described below in combination with any one of above embodiments.

1. Besides the SIB indicates multiple sets of resource default configurations for the reference signals, the paging DCI indicates the available statues of resources based on multiple sets of available status indicators of the resources, such as a bitmap.

2. The DCI indication information can also determine whether reference signals on different beams are available.

3. For the optimization of configuration parameters, if multiple sets (two sets) of resources are both TRSs, since the tracking bandwidth of the idle UE is on the initial access bandwidth, the same configuration parameter can be multiplexed for the physical layer configuration parameters, with the addition of an extended set of shift values. That is, if they both are TRSs, one configuration parameter can be multiplexed for the frequency domain resource configuration parameters, and shift values can be given for the time domain configuration resource parameters.

4. If the TRS and CSI-RS are included, it is necessary to configure two sets of time and frequency resource configuration parameters separately. Other parameters can be multiplexed, and the available status indicator(s) is a bitmap.

5. The UE autonomously selects an appropriate location before a paging occasion as reference, and instructs the UE to carry out reasonable tracking and power saving through the above available status indicator(s).

6. The multiplexed configuration parameters in 4 are shown in Table 1, in which the separated configuration parameter are not listed.

7. The multiple sets of reference signals use the same SCS, so that the configuration can be simplified. One parameter can be configured by default.

Embodiments of the disclosure also provide an information transmission apparatus, applied in a base station. As illustrated in FIG. 4, the information transmission apparatus 100 includes: a first sending module 110.

The first sending module 110 is configured to send configuration information associated with N reference signals, in which the configuration information is at least configured to indicate a first configuration parameter common to the N reference signals, and the reference signals are at least configured to be received by at least one of an idle UE or an inactive UE, in which N is a positive integer greater than or equal to 2, and the first configuration parameter is configured to transmit the N reference signals.

In one embodiment, the configuration information is further configured to indicate second configuration parameters respectively associated with the N reference signals, in which the first configuration parameter is different from the second configuration parameter, and the second configuration parameter is configured to transmit a reference signal associated with the second configuration parameter.

In one embodiment, in response to the reference signal including: a TRS and a CSI-RS, the second configuration parameter at least includes: a frequency domain resource configuration parameter and a time domain resource configuration parameter.

In one embodiment, the configuration information is configured to indicate:

a third configuration parameter of a first reference signal in the N reference signals; and a shift value between a third configuration parameter of a second reference signal in the N reference signals and the third configuration parameter of the first reference signal, in which the first reference signal is different from the second reference signal, the first configuration parameter is different from the third configuration parameter, and the third configuration parameter is configured to transmit a reference signal associated with the third configuration parameter.

In one embodiment, in response to the reference signal including: at least two TRSs, the first configuration parameter at least includes a frequency domain resource configuration parameter, and the third configuration parameter at least includes a time domain resource configuration parameter.

In an embodiment, the apparatus further includes:

a second sending module 120, configured to send an available status indicator, in which the available status indicator is configured to indicate whether to send each reference signal on a corresponding transmission resource, indicated by the configuration information, corresponding to each reference signal.

In one embodiment, the available status indicator is configured to indicate whether to send each reference signal on a corresponding beam for transmitting each reference signal indicated by the configuration information.

In one embodiment, the second sending module 120 includes:

a sending sub-module 121, configured to send paging DCI carrying the available status indicator.

In an embodiment, the reference signal includes:

a TRS and/or a CSI-RS.

Embodiments of the disclosure also provide an information transmission apparatus, applied in a UE. As illustrated in FIG. 5, the information transmission apparatus 200 includes: a first receiving module 210 and a first determining module 220.

The first receiving module 210 is configured to receive configuration information associated with N reference signals.

The first determining module 220 is configured to determine, based on the configuration information, a first configuration parameter common to the N reference signals, in which the reference signals are at least configured to be received by at least one of an idle UE or an inactive UE, N is a positive integer greater than or equal to 2, and the first configuration parameter is configured to transmit the N reference signals.

In one embodiment, the apparatus 200 further includes: a second determining module 230.

The second determining module 230 is configured to determine, based on the configuration information, second configuration parameters respectively associated with the N reference signals, in which the first configuration parameter is different from the second configuration parameter, and the second configuration parameter is configured to transmit a reference signal associated with the second configuration parameter.

In one embodiment, in response to the reference signal including: a TRS and a CSI-RS, the second configuration parameter at least includes: a frequency domain resource configuration parameter and a time domain resource configuration parameter.

In one embodiment, the apparatus 200 further includes: a third determining module 240 and a fourth determining module 250.

The third determining module 240 is configured to determine, based on the configuration information, a third configuration parameter of a first reference signal in the N reference signals, and a shift value between a third configuration parameter of a second reference signal in the N reference signals and the third configuration parameter of the first reference signal.

The fourth determining module 250 is configured to determine the third configuration parameter of the second reference signal based on the third configuration parameter of the first reference signal and the shift value, in which the first configuration parameter is different from the third configuration parameter, and the third configuration parameter is configured to transmit a reference signal associated with the third configuration parameter.

In one embodiment, in response to the reference signal including: at least two TRSs, the first configuration parameter at least includes a frequency domain resource configuration parameter, and the third configuration parameter at least includes a time domain resource configuration parameter.

In one embodiment, the apparatus 200 further includes: a second receiving module 260 and a fifth determining module 270.

The second receiving module 260 is configured to receive an available status indicator.

The fifth determining module 270 is configured to determine, based on the available status indicator, whether to send each reference signal on a corresponding transmission resource, indicated by the configuration information, corresponding to each reference signal.

In one embodiment, the fifth determining module 270 includes: a determining sub-module 271.

The determining sub-module 271 is configured to determine whether to send each reference signal on a corresponding beam for transmitting each reference signal indicated by the configuration information.

In one embodiment, the first receiving module 210 includes: a receiving sub-module 211.

The receiving sub-module 211 is configured to receive paging DCI carrying the available status indicator.

In one embodiment, the reference signal includes:
a TRS and/or a CSI-RS.

In an example embodiment, the first sending module 110, the second sending module 120, the first receiving module 210, the first determining module 220, the second determining module 230, the third determining module 240, the fourth determining module 250, the second receiving module 260, and the fifth determining module 270 may be implemented by one or more Central Processing Units (CPUs), Graphics Processing Units (GPUs), Baseband Processors (BPs), Application Specific Integrated Circuits (ASICs), Digital Signal Processors (DSPs), Programmable Logic Devices (PLDs), Complex Programmable Logic Devices (CPLDs), Field-Programmable Gate Arrays (FP-GAs), general processors, controllers, Micro Controller Units (MCUs), microprocessors or other electronic components, for performing the above methods.

Figure 6:
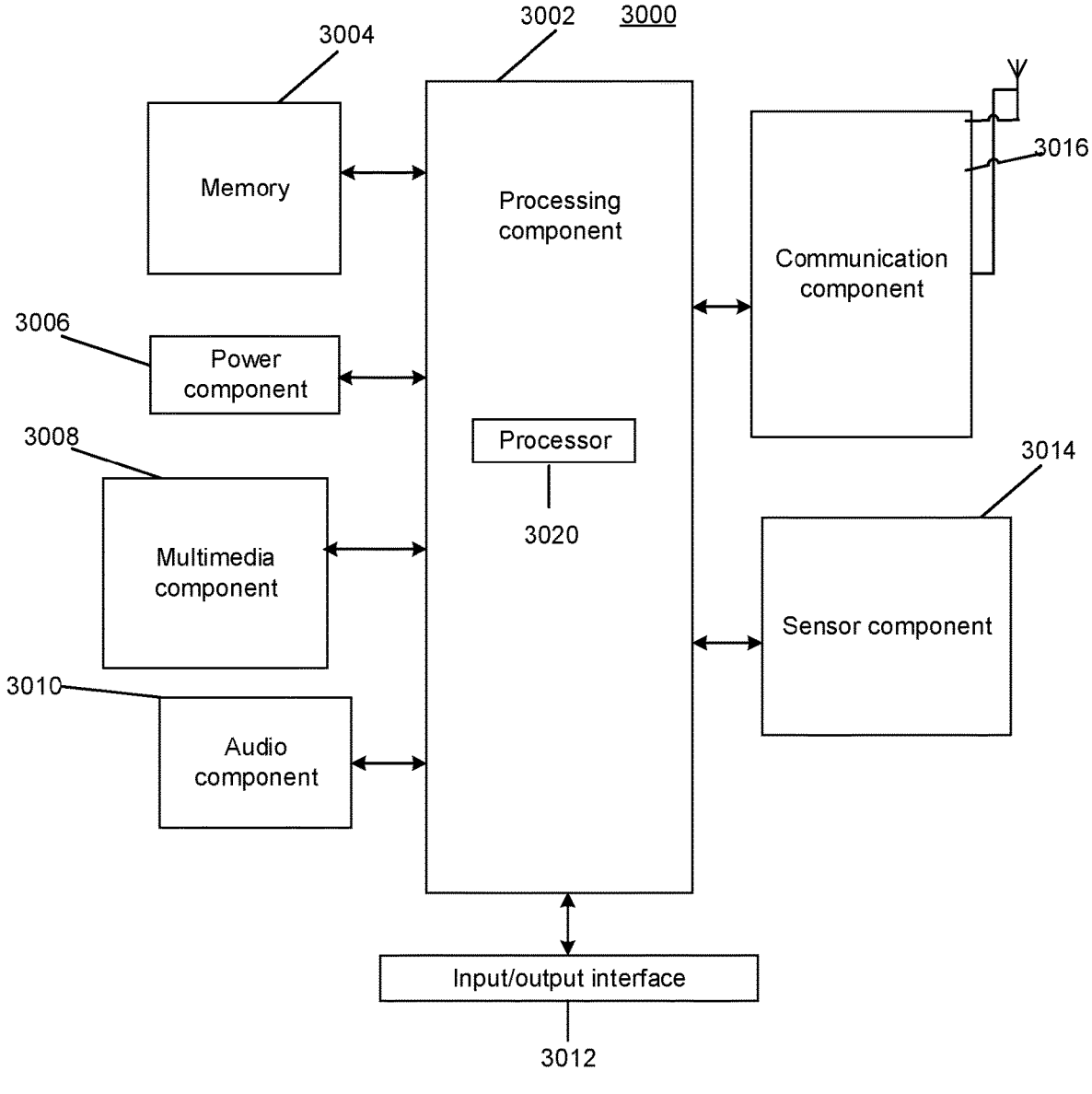
FIG. 6 is a block diagram illustrating a device for transmitting information according to an example embodiment.

FIG. 6 is a block diagram illustrating a device 3000 for transmitting information according to an example embodiment. For example, the device 3000 may be a mobile phone, a computer, a digital broadcasting terminal, a message transceiver device, a game console, a tablet device, a medical device, a fitness device and a personal digital assistant.

As illustrated in FIG. 6, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to implement all or part of the steps in the above described method. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a Complementary Metal Oxide Semiconductor (CMOS) or Charge-Coupled Device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as Wi-Fi, 2G or 3G, or a combination thereof. In an example embodiment, the communication component 3016 receives a broadcast signal or broadcast associated information from an external broadcast management system via a broadcast channel. In an example embodiment, the communication component 3016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the example embodiment, the device 3000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In an example embodiment, there is also provided a non-transitory computer readable storage medium including executable instructions, such as the memory 3004. The above instructions may be executed by the processor 3020 in the device 3000, for performing the above methods. For example, the non-transitory computer-readable storage medium may be a ROM, a Random Access Memory (RAM), a CD-ROM, a magnetic tape, a floppy disc, and an optical data storage device.

With the information transmission method, the information transmission apparatus, the communication device and the storage medium according to embodiments of the disclosure, the base station sends the configuration information associated with the N reference signals. The configuration information is at least configured to indicate a first configuration parameter common to the N reference signals, and the reference signals are at least configured to be received by an idle UE and/or an inactive UE. N is a positive integer greater than or equal to 2. The first configuration parameter is configured to transmit the N reference signals. Therefore, the first configuration parameter common to the N reference signals is indicated by the configuration information, and there is no need to configure the first configuration parameter of each reference signal respectively. On the one hand, the base station can reduce the signaling load when sending the configuration parameters, and can optimize and multiplex as many physical layer configuration parameters as possible. On the other hand, the UE no longer needs to determine the first configuration parameter one by one for each reference signal, and can determine the first configuration parameter for all reference signals at one time, which improves the efficiency of determining the configuration parameter.

In some examples, an information transmission method performed by a base station includes sending configuration information associated with N reference signals, in which the configuration information is at least configured to indicate a first configuration parameter common to the N reference signals, and the reference signals are at least configured to be received by at least one of an idle user equipment (UE) or an inactive UE, in which N is a positive integer greater than or equal to 2, and the first configuration parameter is configured to transmit the N reference signals.

In some examples, the configuration information is configured to indicate second configuration parameters respectively associated with the N reference signals, in which the first configuration parameter is different from the second configuration parameter, and the second configuration parameter is configured to transmit a reference signal associated with the second configuration parameter.

In some examples, in response to the reference signal including a TRS and a CSI-RS, the second configuration parameter at least includes a frequency domain resource configuration parameter and a time domain resource configuration parameter.

In some examples, the configuration information is configured to indicate: a third configuration parameter of a first reference signal in the N reference signals; and a shift value between a third configuration parameter of a second reference signal in the N reference signals and the third configuration parameter of the first reference signal, in which the first reference signal is different from the second reference signal, the first configuration parameter is different from the third configuration parameter, and the third configuration parameter is configured to transmit a reference signal associated with the third configuration parameter.

In some examples, in response to the reference signal including at least two TRSs, the first configuration parameter at least includes a frequency domain resource configuration parameter, and the third configuration parameter at least includes a time domain resource configuration parameter.

In some examples, the method further includes sending an available status indicator, in which the available status indicator is configured to indicate whether to send each reference signal on a corresponding transmission resource, indicated by the configuration information, corresponding to each reference signal.

In some examples, the available status indicator is configured to indicate whether to send each reference signal on a corresponding beam for transmitting each reference signal indicated by the configuration information.

In some examples, sending the available status indicator includes sending paging DCI carrying the available status indicator.

In some examples, an information transmission method performed by a UE includes receiving configuration information associated with N reference signals; and determining, based on the configuration information, a first configuration parameter common to the N reference signals, in which the reference signals are at least configured to be received by at least one of an idle UE or an inactive UE, N is a positive integer greater than or equal to 2, and the first configuration parameter is configured to transmit the N reference signals.

In some examples, the method includes determining, based on the configuration information, second configuration parameters respectively associated with the N reference signals, in which the first configuration parameter is different from the second configuration parameter, and the second configuration parameter is configured to transmit a reference signal associated with the second configuration parameter.

In some examples, in response to the reference signal including a TRS and a CSI-RS, the second configuration parameter at least includes a frequency domain resource configuration parameter and a time domain resource configuration parameter.

In some examples, the method includes determining, based on the configuration information, a third configuration parameter of a first reference signal in the N reference signals, and determining a shift value between a third configuration parameter of a second reference signal in the N reference signals and the third configuration parameter of the first reference signal; and determining the third configuration parameter of the second reference signal based on the third configuration parameter of the first reference signal and the shift value, in which the first configuration parameter is different from the third configuration parameter, and the third configuration parameter is configured to transmit a reference signal associated with the third configuration parameter.

In some examples, in response to the reference signal including at least two TRSs, the first configuration parameter at least includes a frequency domain resource configuration parameter, and the third configuration parameter at least includes a time domain resource configuration parameter.

In some examples, the method further includes receiving an available status indicator; and determining, based on the available status indicator, whether to send each reference signal on a corresponding transmission resource, indicated by the configuration information, corresponding to each reference signal.

In some examples, determining, based on the available status indicator, whether to send each reference signal on the corresponding transmission resource, indicated by the configuration information, corresponding to each reference signal includes determining, based on the available status indicator, whether to send each reference signal on a corresponding beam for transmitting each reference signal indicated by the configuration information.

In some examples, receiving the available status indicator includes receiving paging DCI carrying the available status indicator.

In some examples, an information transmission apparatus includes a first sending module, configured to send configuration information associated with N reference signals, in which the configuration information is at least configured to indicate a first configuration parameter common to the N reference signals, and the reference signals are at least configured to be received by at least one of an idle user equipment (UE) or an inactive UE, in which N is a positive integer greater than or equal to 2, and the first configuration parameter is configured to transmit the N reference signals.

In some examples, the configuration information is configured to indicate second configuration parameters respectively associated with the N reference signals, in which the first configuration parameter is different from the second configuration parameter, and the second configuration parameter is configured to transmit a reference signal associated with the second configuration parameter.

In some examples, in response to the reference signal including a tracking reference signal (TRS) and a channel state information reference signal (CSI-RS), the second configuration parameter at least includes a frequency domain resource configuration parameter and a time domain resource configuration parameter.

In some examples, the configuration information is configured to indicate: a third configuration parameter of a first reference signal in the N reference signals; and a shift value between a third configuration parameter of a second reference signal in the N reference signals and the third configuration parameter of the first reference signal, in which the first reference signal is different from the second reference signal, the first configuration parameter is different from the third configuration parameter, and the third configuration parameter is configured to transmit a reference signal associated with the third configuration parameter.

In some examples, in response to the reference signal including at least two TRSs, the first configuration parameter at least includes a frequency domain resource configuration parameter, and the third configuration parameter at least includes a time domain resource configuration parameter.

In some examples, the method includes a second sending module, configured to send an available status indicator, in which the available status indicator is configured to indicate whether to send each reference signal on a corresponding transmission resource, indicated by the configuration information, corresponding to each reference signal.

In some examples, the available status indicator is configured to indicate whether to send each reference signal on a corresponding beam for transmitting each reference signal indicated by the configuration information.

In some examples, the second sending module includes a sending sub-module, configured to send paging DCI carrying the available status indicator.

In some examples, the apparatus further includes a first receiving module, configured to receive configuration information associated with N reference signals; and a first determining module, configured to determine, based on the configuration information, a first configuration parameter common to the N reference signals, in which the reference signals are at least configured to be received by at least one of an idle user equipment (UE) or an inactive UE, N is a positive integer greater than or equal to 2, and the first configuration parameter is configured to transmit the N reference signals.

In some examples, the apparatus further includes a second determining module, configured to determine, based on the configuration information, second configuration parameters respectively associated with the N reference signals, in which the first configuration parameter is different from the second configuration parameter, and the second configuration parameter is configured to transmit a reference signal associated with the second configuration parameter.

In some examples, in response to the reference signal including a tracking reference signal (TRS) and a channel state information reference signal (CSI-RS), the second configuration parameter at least includes a frequency domain resource configuration parameter and a time domain resource configuration parameter.

In some examples, the apparatus further includes a third determining module, configured to determine, based on the configuration information, a third configuration parameter of a first reference signal in the N reference signals, and determine a shift value between a third configuration parameter of a second reference signal in the N reference signals and the third configuration parameter of the first reference signal; and a fourth determining module, configured to determine the third configuration parameter of the second reference signal based on the third configuration parameter of the first reference signal and the shift value, in which the first configuration parameter is different from the third configuration parameter, and the third configuration parameter is configured to transmit a reference signal associated with the third configuration parameter.

In some examples, in response to the reference signal including at least two TRSs, the first configuration parameter at least includes a frequency domain resource configuration parameter, and the third configuration parameter at least includes a time domain resource configuration parameter.

In some examples, the apparatus further includes a second receiving module, configured to receive an available status indicator; and a fifth determining module, configured to determine, based on the available status indicator, whether to send each reference signal on a corresponding transmission resource, indicated by the configuration information, corresponding to each reference signal.

In some examples, the fifth determining module includes a determining sub-module, configured to determine, based on the available status indicator, whether to send each reference signal on a corresponding beam for transmitting each reference signal indicated by the configuration information.

In some examples, the first receiving module includes a receiving sub-module, configured to receive paging DCI carrying the available status indicator.

In some examples, a communication device, including a processor, a memory and an executable program stored on the memory and executable by the processor, in which when the executable program is executed by the processor, any one of the above information transmission method is performed.

In some examples, a storage medium, having an executable program stored thereon, in which when the executable program is executed by a processor, any one of the above information transmission method is performed.

Other embodiments of the disclosure will be apparent to those skilled in the art from consideration of the specification and practice of the disclosure disclosed here. The disclosure is intended to cover any variations, uses, or adaptations of the embodiments of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information transmission method, performed by a base station, comprising:

sending configuration information associated with N reference signals, wherein the configuration information is at least configured to indicate a first configuration parameter common to the N reference signals, and the N reference signals are at least configured to be received by at least one of an idle user equipment (UE) or an inactive UE, wherein N is a positive integer greater than or equal to 2, and the first configuration parameter is configured to transmit the N reference signals;

wherein the configuration information is configured to indicate: a second configuration parameter of a first reference signal in the N reference signals; and a shift value between a second configuration parameter of a second reference signal in the N reference signals and the second configuration parameter of the first reference signal, wherein the first reference signal is different from the second reference signal, the first configuration parameter is different from the second configuration parameter, and the second configuration parameter is configured to transmit a reference signal associated with the second configuration parameter;

wherein the first reference signal is a tracking reference signal (TRS) and the second reference signal is a channel state information reference signal (CSI-RS), or the first reference signal is a channel state information reference signal (CSI-RS) and the second reference signal is a tracking reference signal (TRS).

2. The method of claim 1, wherein the configuration information is configured to indicate third configuration parameters respectively associated with the N reference signals, wherein the first configuration parameter is different from the third configuration parameter, and the third configuration parameter is configured to transmit a reference signal associated with the third configuration parameter.

3. The method of claim 2, wherein the reference signal comprises a tracking reference signal (TRS) and a channel state information reference signal (CSI-RS), and the third configuration parameter at least comprises: a frequency domain resource configuration parameter and a time domain resource configuration parameter.

4. The method of claim 1, wherein the reference signal comprises at least two TRSs, and the first configuration parameter at least comprises a frequency domain resource configuration parameter, and the second configuration parameter at least comprises a time domain resource configuration parameter.

5. The method of claim 1, further comprising:

sending an available status indicator, wherein the available status indicator is configured to indicate whether to send each reference signal on a corresponding transmission resource, indicated by the configuration information, corresponding to each reference signal.

6. The method of claim 5, wherein the available status indicator is configured to indicate whether to send each reference signal on a corresponding beam for transmitting each reference signal indicated by the configuration information.

7. The method of claim 5, wherein sending the available status indicator comprises:

sending paging downlink control information (DCI) carrying the available status indicator.

8. An information transmission method, performed by a user equipment (UE), comprising:

receiving configuration information associated with N reference signals;

determining, based on the configuration information, a first configuration parameter common to the N reference signals, wherein the N reference signals are at least configured to be received by at least one of an idle UE or an inactive UE, N is a positive integer greater than or equal to 2, and the first configuration parameter is configured to transmit the N reference signals;

determining, based on the configuration information, a second configuration parameter of a first reference signal in the N reference signals, and determining a shift value between a second configuration parameter of a second reference signal in the N reference signals and the second configuration parameter of the first reference signal; and determining the second configuration parameter of the second reference signal based on the second configuration parameter of the first reference signal and the shift value, wherein the first configuration parameter is different from the second configuration parameter, and the second configuration parameter is configured to transmit a reference signal associated with the second configuration parameter;

wherein the first reference signal is a tracking reference signal (TRS) and the second reference signal is a channel state information reference signal (CSI-RS), or the first reference signal is a channel state information reference signal (CSI-RS) and the second reference signal is a tracking reference signal (TRS).

9. The method of claim 8, further comprising:

determining, based on the configuration information, third configuration parameters respectively associated with the N reference signals, wherein the first configuration parameter is different from the third configuration parameter, and the third configuration parameter is configured to transmit a reference signal associated with the third configuration parameter.

10. The method of claim 9, wherein the reference signal comprises a tracking reference signal (TRS) and a channel state information reference signal (CSI-RS), and the third configuration parameter at least comprises: a frequency domain resource configuration parameter and a time domain resource configuration parameter.

11. The method of claim 8, wherein the reference signal comprises at least two TRSs, the first configuration parameter at least comprises a frequency domain resource configuration parameter, and the second configuration parameter at least comprises a time domain resource configuration parameter.

12. The method of claim 8, further comprising:

receiving an available status indicator; and determining, based on the available status indicator, whether to send each reference signal on a corresponding transmission resource, indicated by the configuration information, corresponding to each reference signal.

13. The method of claim 12, wherein determining, based on the available status indicator, whether to send each reference signal on the corresponding transmission resource, indicated by the configuration information, corresponding to each reference signal comprises:

determining, based on the available status indicator, whether to send each reference signal on a corresponding beam for transmitting each reference signal indicated by the configuration information.

14. The method of claim 12, wherein receiving the available status indicator comprises:

receiving paging DCI carrying the available status indicator.

15. A communication device, comprising a processor, a memory for storing an executable program that when executed by the processor, cause the processor to:

send configuration information associated with N reference signals, wherein the configuration information is at least configured to indicate a first configuration parameter common to the N reference signals, and the N reference signals are at least configured to be received by at least one of an idle user equipment (UE) or an inactive UE, wherein N is a positive integer greater than or equal to 2, and the first configuration parameter is configured to transmit the N reference signals;

wherein the configuration information is configured to indicate: a second configuration parameter of a first reference signal in the N reference signals; and a shift value between a second configuration parameter of a second reference signal in the N reference signals and the second configuration parameter of the first reference signal, wherein the first reference signal is different from the second reference signal, the first configuration parameter is different from the second configuration parameter, and the second configuration parameter is configured to transmit a reference signal associated with the second configuration parameter;

wherein the first reference signal is a tracking reference signal (TRS) and the second reference signal is a channel state information reference signal (CSI-RS), or the first reference signal is a channel state information reference signal (CSI-RS) and the second reference signal is a tracking reference signal (TRS).

16. A non-transitory computer-readable storage medium, having an executable program stored thereon, wherein when the executable program is executed by a processor, the information transmission method of claim 1 is performed.

17. A communication device, comprising a processor, a memory for storing an executable program that when executed by the processor, causes the processor to perform the information transmission method of claim 8.

18. A non-transitory computer-readable storage medium, having an executable program stored thereon, wherein when the executable program is executed by a processor, the information transmission method of claim 8 is performed.

* * * * *